April 1, 1930.　　　H. C. RICHARDSON　　　1,752,395
LANDING GEAR
Filed Oct. 4, 1926　　　3 Sheets-Sheet 1
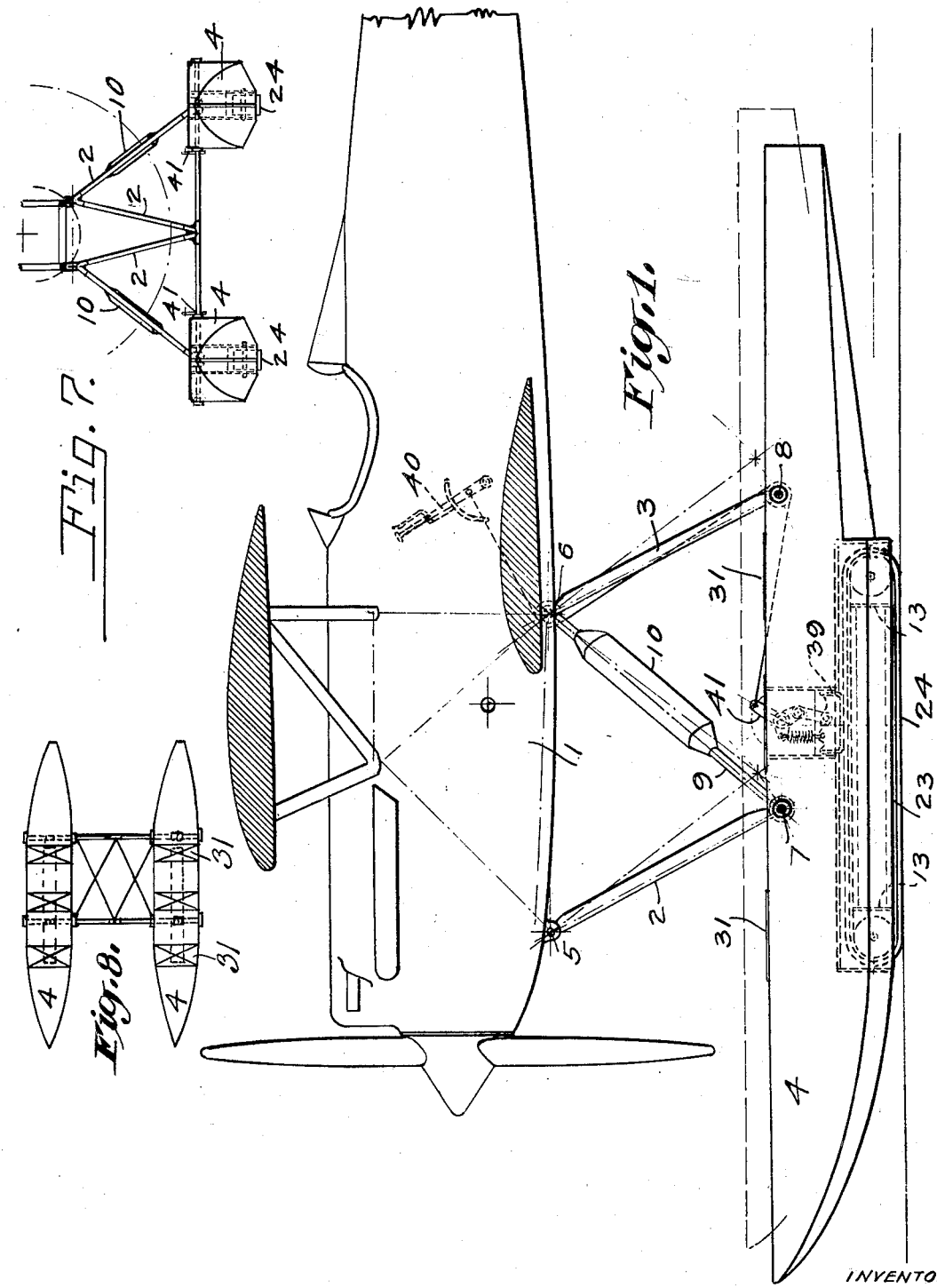
INVENTOR
Holden C. Richardson
BY Robert A. Lanen
ATTORNEY April 1, 1930.  H. C. RICHARDSON  1,752,395
LANDING GEAR
Filed Oct. 4, 1926   3 Sheets-Sheet 2
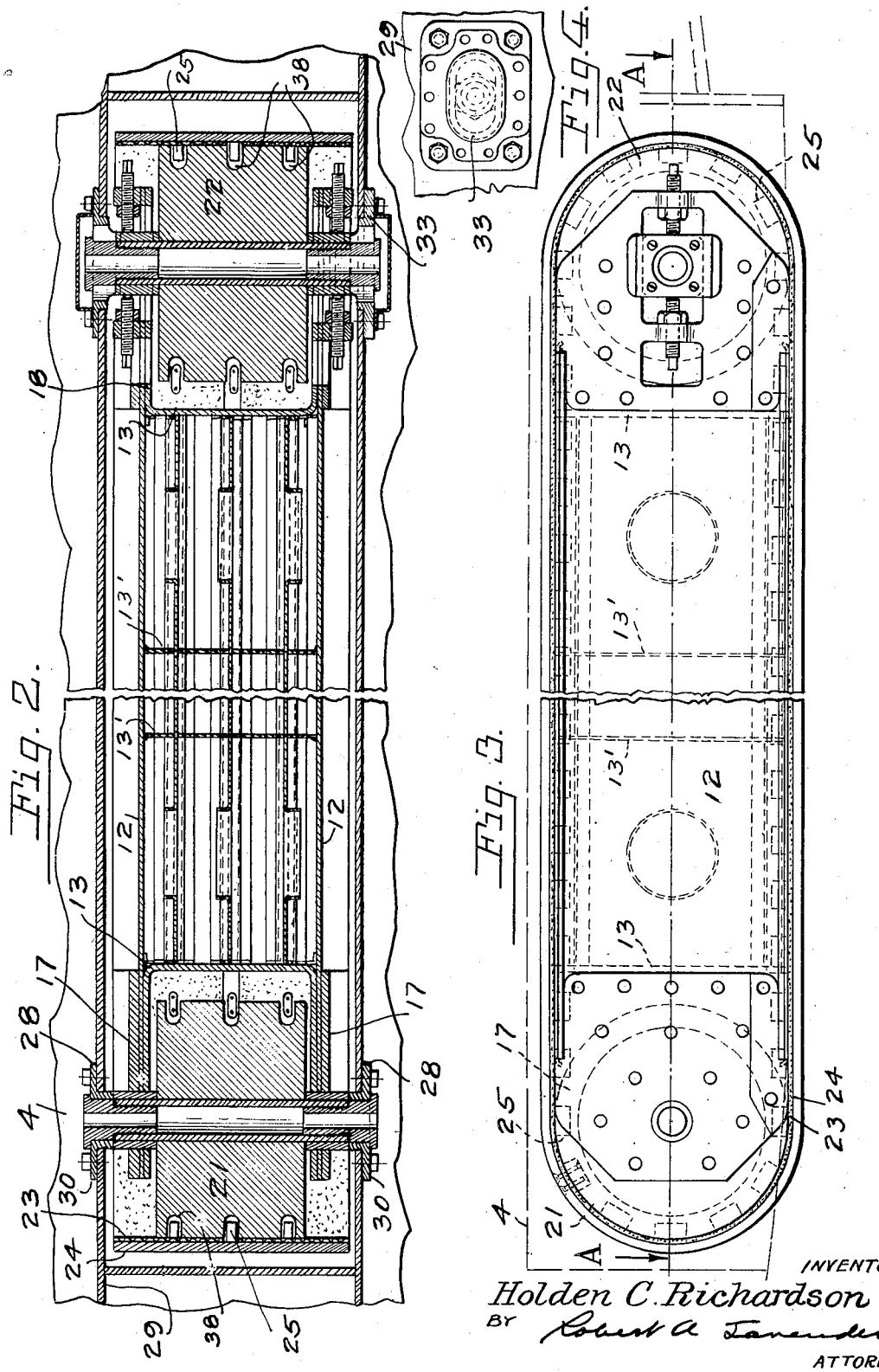
INVENTOR
Holden C. Richardson
BY
ATTORNEY

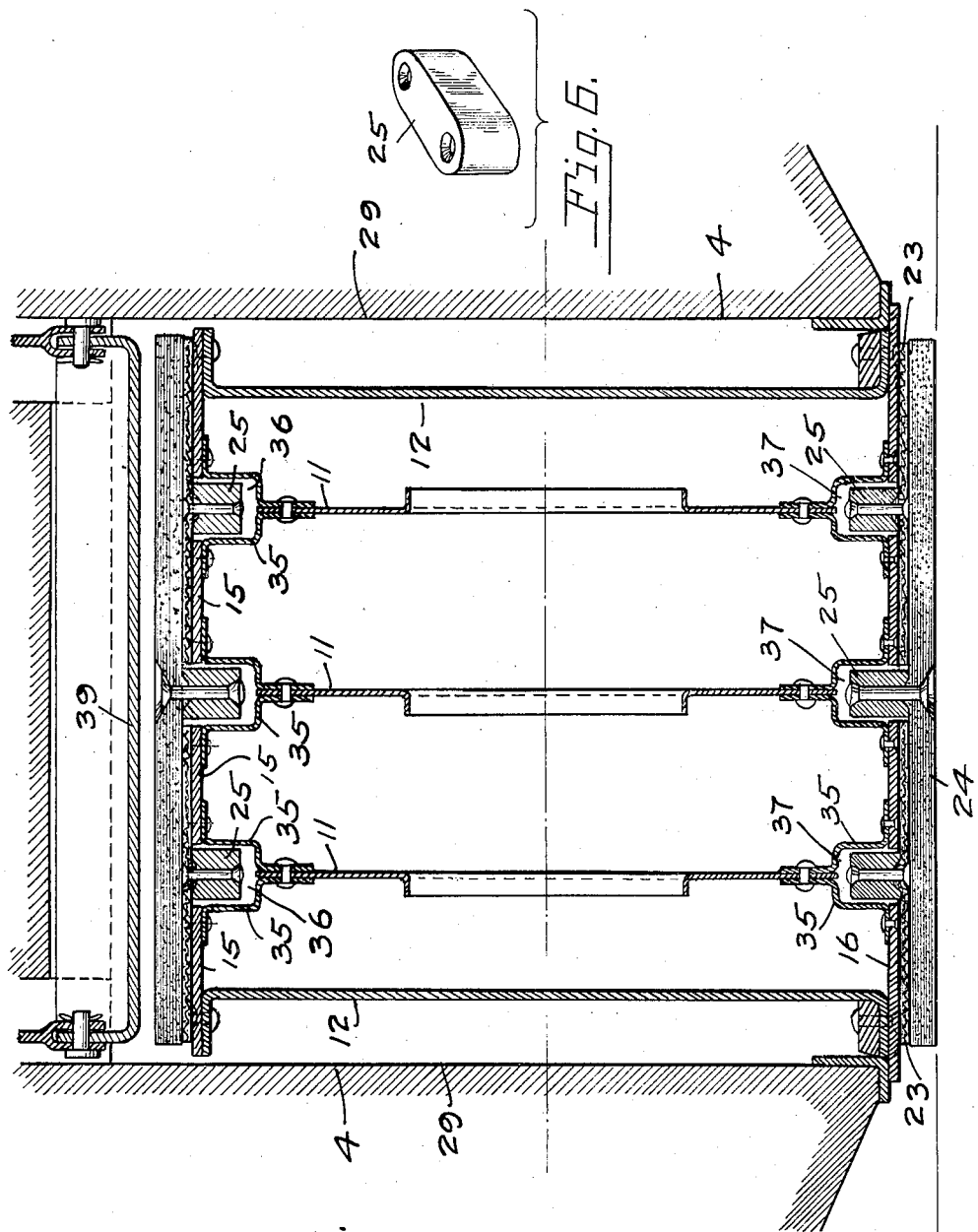

Patented Apr. 1, 1930

1,752,395

UNITED STATES PATENT OFFICE

HOLDEN C. RICHARDSON, OF WASHINGTON, DISTRICT OF COLUMBIA

LANDING GEAR

Application filed October 4, 1926. Serial No. 139,395.

(GRANTED UNDER THE ACT OF MARCH 3, 1883, AS AMENDED APRIL 30, 1928; 370 O. G. 757)

My invention relates broadly to a landing gear for seaplanes and more particularly to a gear permitting seaplanes to make a landing on water, land, or the deck of a ship, or the like.

The principal object of my invention is to provide a landing gear having a shock absorbing means incorporated therewith.

Another object is to provide a gear of the character described having a speed retarding mechanism associated therewith.

A further object is to provide a shock absorbing chassis for sea planes in which the pontoon or pontoons are attached to the body of the seaplane by fore and aft inclined supporting members of equal length, hinged to swing in a transverse plane, the amount of swing being limited by the cushioning action of shock absorbing strut members located diagonally opposite to the supporting frame members.

A still further object is to provide a novel construction of pontoons embodying a manually controlled means for retarding the speed of the seaplane after contact has been made during a landing.

With the above and other objects in view the invention consists in the construction, combination and arrangement of parts as will be hereinafter more fully described.

Reference is to be had to the accompanying drawings forming a part of this specification in which like reference characters indicate corresponding parts throughout the several views and in which:

Figure 1 is a side elevation of a seaplane showing an embodiment of my invention, Figure 2 is a horizontal section taken on the line A—A of Figure 3, showing details of my retarding means, Figure 3 is a side elevation of the retarding means, Figure 4 is a side elevation of one of the bearings supporting the retarding mechanism, Figure 5 is an enlarged transverse section on the line B—B of Figure 1, Figure 6 is a perspective view of one of the cleats for preventing sidewise slipping of the endless belt, Figure 7 is a fragmentary front elevation showing the arrangement of the frame members, and Figure 8 is a plan view of the pontoons showing the arrangement of the bracing wires.

My speed retarding mechanism is housed in a pontoon and consists of a removable and adjustable member having bearings in the side walls of the pontoon for supporting a frame member with rollers at its ends carrying an endless fabric belt saturated with lubricant such as heavy grease or graphite, and protected from damage of impact with the landing surface by an endless outer armor belt of heavy leather or composition fabric tread. The amount of travel or speed at which the retarding mechanism is permitted to slip when landing is governed by an adjustable brake mechanism controlled by a lever or suitable mechanism within reach of the pilot and connected by suitable tension members to a brake shoe housed within the pontoon and above the endless belts, which when lowered causes a clamping action of the belts between the brake shoe and the upper surface of the belt supporting member. The rollers supporting the belts extend slightly below the bottom line of the pontoons so that the force of impact is received on the belting and the frame backing over approximately the entire distance between the rollers.

Referring more particularly to the drawings, 1 indicates the body portion of a seaplane of any conventional type and to which the floats or pontoons 4 are connected by fore and aft triangular frame members 2 and 3 hinged at their upper ends 5 and 6 to the frame structure of the body and hinged at their lower ends to the pontoons at 7 and 8. The travel of the lower ends of the triangular members in relation to the upper ends is governed by the cushioning effect of shock absorbing strut members 9 that are attached at the top to the upper point of attachment of the member 3 and at the bottom to the lower point of attachment of the member 2. It is contemplated that any well known type of shock absorbing mechanism, such as springs, rubber, or hydraulic resisting members, directly or in combination, may be used and such mechanism is indicated generally by the streamline protuberance 10.

The retarding mechanism forming part of the landing gear and shown more fully in detail in Figures 2 and 3 and 5 is situated in a recess formed in the pontoon and comprises side plates 12 connected at their ends by U-shaped reinforcing members 13 and top and bottom plates 15 and 16 secured to the side plates 12, forming a water tight chamber. This chamber is further reinforced by a series of longitudinal members 11. These members are connected to the top and bottom plates by angle irons 35 constructed so as to form guideways 36 that aline with slots 37 formed in the top and bottom plates, the purpose for which will be later explained.

Rollers 21 and 22, provided with grooves 38 and mounted on shafts supported by trunnions 30, carry an endless belt arrangement comprising an inner belt 23 of fabric saturated with suitable lubricant and a protecting or outer armor belt 24 of heavy leather composition fabric, or other wear resisting material. The inner belt 23 has a plurality of guide cleats 25 secured to its inner surface that move in the slots 37 and guideways 36, and when on the rollers in the grooves 38, to prevent the belts from slipping off the rollers. The trunnion supporting the shaft of the rollers 22 is mounted in an elongated bearing 33 (see Figure 4) and is adjustable fore and aft by screws 34 to regulate the tension on the belts, access being had thereto through openings 31 in the top of the pontoon. The weight of the retarding mechanism unit is supported by walls 29 of the pontoon 4.

To control manually the distance the seaplane will travel when alighting on a limited area, such as the deck of a vessel, I employ an additional braking means operated by the pilot. This means consists of a brake shoe 39 contacting with the outer belt 23 and operated by a lever 40 in the cockpit of the seaplane. When the lever is moved in the desired direction it operates a bell crank lever 41 forcing the brake shoe downwardly clamping the belt between it and the top plate 15. It will be understood, however, that I do not limit myself to this particular construction, as any other well known means such as hydraulic power may be applied to the brake shoe.

It will be understood that the above description and accompanying drawings comprehend only the general or preferred embodiment of my invention and that minor detail changes in construction and arrangement of parts may be made within the scope of the appended claims and without sacrificing any of the advantages of my invention.

The invention herein described may be manufactured and used by or for the Government of the United States for governmental purposes without the payment to me of any royalty thereon or therefor.

I claim:

1. In a seaplane, a body portion, pontoons carried thereby, shock absorbing mechanisms mounted between the body portion and pontoons and a speed retarding mechanism mounted in recesses in the pontoons, said mechanisms comprising endless belts, rollers over which the belts pass, guideways in the rollers, and means carried by one of the belts operable in the grooves for maintaining the belts in place.

2. In a seaplane, a body portion, pontoons, means for hingedly connecting the body portion and pontoons, said means body portion and pontoons forming parallelograms, shock absorbing means forming one of the geometrical diagonals of the parallelograms, endless track mechanism carried by the pontoons and braking devices engageable with said mechanism.

HOLDEN C. RICHARDSON.